Figure 1:
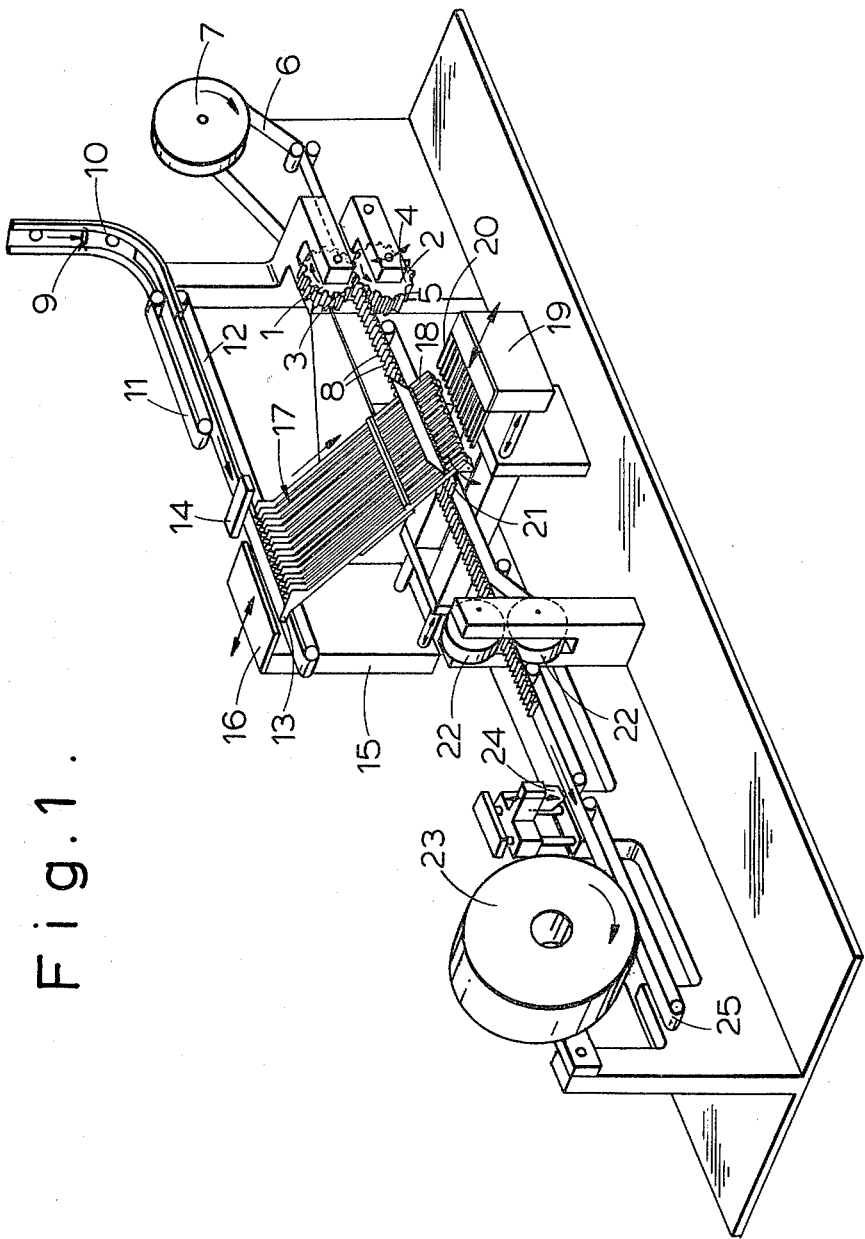

United States Patent [19]
Baker

[11] 4,234,085
[45] Nov. 18, 1980

[54] CLIP STORAGE

[76] Inventor: John D. Baker, Trafagar House, 11, Waterloo Place, London, England

[21] Appl. No.: 954,345

[22] Filed: Oct. 25, 1978

Related U.S. Application Data

[63] Continuation of Ser. No. 795,919, May 11, 1977, abandoned.

[51] Int. Cl.² ............................................. F16B 2/20
[52] U.S. Cl. ................................... 206/337; 206/486
[58] Field of Search ................ 428/181, 182; 55/500; 206/337, 486

[56] References Cited

U.S. PATENT DOCUMENTS

| | | | |
|---|---|---|---|
| 1,841,805 | 1/1932 | Handy | 428/28 |
| 2,302,545 | 11/1942 | Hankoff | 206/337 X |
| 2,756,032 | 7/1956 | Dowell | 428/182 X |
| 3,243,943 | 4/1966 | Getzin | 55/500 X |
| 3,647,593 | 3/1972 | Lingle et al. | 156/300 |

FOREIGN PATENT DOCUMENTS

| | | | |
|---|---|---|---|
| 60657 | 8/1913 | Austria | 206/486 |
| 1351783 | 5/1974 | United Kingdom . | |

Primary Examiner—Henry F. Epstein
Attorney, Agent, or Firm—Paul Fields

[57] ABSTRACT

A supply tape for clips comprises a plurality of pleats running transversely of the length of the tape and a plurality of generally U-shaped spring clips, each of which has opposed arms engaged in opposite sides of one of the pleats. An apparatus is provided for applying clips to the storage tape. The apparatus feeds the tape between a pair of meshing toothed wheels adapted to pleat the tape. U-shaped spring clips are fed to a clip application station where they are received on respective pleats with opposed arms engaged on opposite sides of the pleat.

2 Claims, 2 Drawing Figures

U.S. Patent  Nov. 18, 1980  Sheet 2 of 2  4,234,085

CLIP STORAGE

This is a continuation of application Serial No. 795,919, filed May 11, 1977 and now abandoned.

This invention relates to the storage of spring clips. An object of the invention is to provide a way of storing spring clips which enables the clips to be conveniently supplied to a machine for applying the clips to an article. The invention is particularly applicable to spring clips, preferably of plastics material, which are intended to grip and hold folded articles or garments such as skirts, blouses or like garments. It is well known that such garments are usually supplied by a maker in a folded condition with the various folds pinned or clipped together.

According to the invention there is provided a supply tape for clips, the said tape comprising a plurality of pleats running transversely of the length of the tape and a plurality of generally U-shaped spring clips, each of which has its opposed arms engaged on opposite sides of one of the pleats.

The invention also provides an apparatus for applying clips to a storage tape comprising means for feeding the tape between a pair of meshing toothed wheels adapted to pleat the tape, means for feeding generally U-shaped springs clips to a clip application station, and means located at the application station for engaging the clips on the pleats, each clip being received on a respective pleat with its opposed arms engaged on opposite sides of the pleat.

The invention is particularly applicable to clips constructed generally as described in the specification of British Patent No. 1,351,783 but it will be appreciated that the invention is not confined to the storage of such clips.

Figure 2:
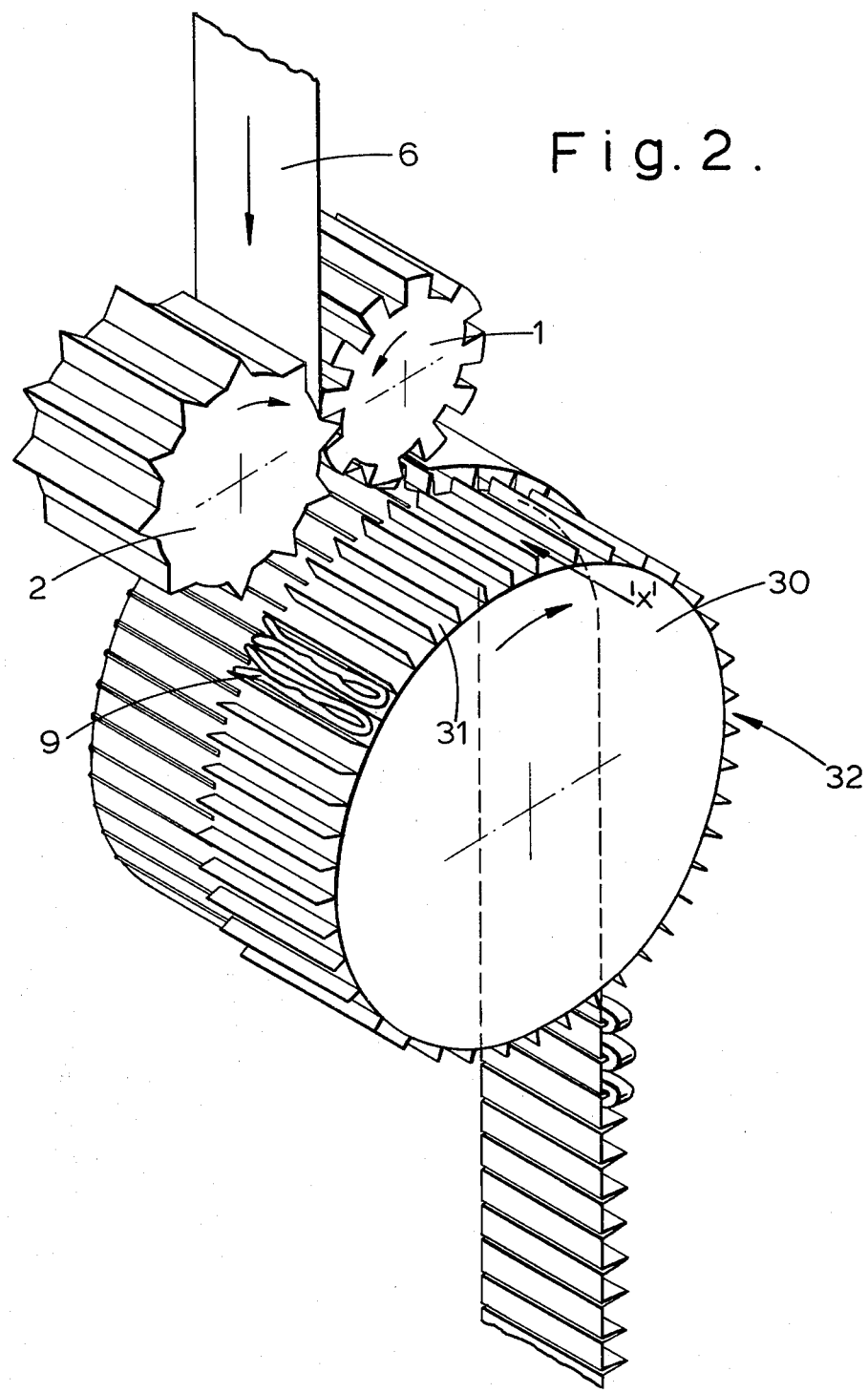

In the accompanying drawings:

FIG. 1 is a diagrammatic perspective view of an apparatus according to the invention; and FIG. 2 is a similar view of part of a modified form of apparatus.

FIG. 1 shows an apparatus for producing a store of spring clips which comprises a pair of toothed forming rolls 1 and 2 which are rotatable about parallel axes. The teeth of these forming rollers mesh with each other. The roller 1 has teeth 3 which are generally square in axial section, and the teeth 4 of the roller 2 are triangular, being separated from one another by flat portions 5.

A tape 6 of suitable foldable material, for example paper, is supplied from a supply reel 7 to the forming rollers 1,2 and passes between the rollers in a tortuous path defined by the meshing teeth. The passage of the tape between the teeth of the forming rollers causes the tape to be doubled on itself at regularly spaced intervals along its length, thereby to form pleats or folds 8 extending transversely of the length of the tape. Clips 9 are fed from a supply thereof, for example a vibrating hopper, to a feed channel 10. The clips are forwarded from the channel 10 between an upper driven belt 11 and a lower driven belt 12 as far as a stop 13. Clips are built up behind the stop until the build up is detected by a sensor 14, for example a photo-electric sensor. An upper pusher carriage 15 which carries a pusher plate 16 is then caused to move forwardly to propel the clips into an arrangement of inclined chutes 17. The clips travel down the assembly, one in each chute, until they come to rest in a lower pivoted section 18 thereof. The section 18 is pivoted downwardly into a horizontal position and a lower pusher carriage 19 having a plurality of spaced fingers 20 is then activated to push the clips from the section 18 through a guide 21 on to pleats 8 of the tape 6. One clip is received on each pleat.

The tape carrying the clips passes between a pair of rollers 22 whose surfaces are preferably of a soft material such as soft rubber, which ensure that the clips are firmly seated on the pleats. The tape with the clips thereon is then wound up on a reel 23. When sufficient clips have been wound on a clip-free unpleated section is wound on to complete the reel. The tape is then severed by a knife 24. The reel 23 is driven and its surface by a belt 25. Tape is taken up intermittently on the reel, the pusher carriage 19 operating when the tape is stationary.

A modified embodiment is shown in FIG. 2. In this the tape 6 is pleated between two rollers 1,2 identical to those shown in FIG. 1. The pleated tape then passes from the rollers 1,2 to a feed drum 30. This feed drum rotates about an axis parallel to, and adjacent, the rollers 1,2.

The feed drum 30 has a plurality of clip feeding channels 31 regularly spaced around its periphery. These feed channels extend lengthwise of the drum over about half the peripheral surface of the drum. The other half of the drum is substantially smooth. The folded or pleated tape is fed from the forming rollers on to the smooth surface of the feed drum.

Spring clips 9 of which only two are shown are loaded into the feed channels 31 at a loading station (not shown) past which the drum travels prior to reaching the rollers 1,2. These clips are loaded into the feed channels with their open end or mouth facing the smooth surface of the drum. The rate of feed of tape and the speed of rotation of the drum are such that each pleat of the tape drives on the drum immediately opposite the open end or mouth of a spring clip. A pushing device (not shown) is provided to enter each feed channel and engage the closed ends of the clips and push the open ends over the doubled folds or pleats at a pushing station 32, movement being continued until the pleat or doubled fold is wholly embraced by the spring clip. The tape with the clips thereon is removed from the feed drum and wound on to a suitable reel or coiling drum, as in FIG. 1.

Instead of winding the tape with clips attached on a suitable reel it may be folded into a suitable carton of container or collated in any other way suitable for subsequently feeding the tapes into a clipping apparatus.

I claim:

1. A flexible carrier tape for resilient clips, said tape comprising a plurality of generally inverted V-shaped pleats extending transversely along the length of said tape and terminating at the edges thereof, and a respective clip on each one of said plurality of pleats, each of said clips comprising a generally U-shaped spring clip having transversely extending arms in facing relationship to each other and a bight portion connecting said arms, each of said clips being positioned on a respective one of said pleats with the arms thereof extending along opposite sides of said pleat and with said bight portion extending about an end edge of the associated pleat.

2. A supply tape for clips according to claim 1 wherein the pleats are spaced apart longitudinally on the tape, with each pleat separated from adjacent pleats by an unpleated portion of the tape.

* * * * *